(12) United States Patent
Grondalski

(10) Patent No.: US 7,370,042 B2
(45) Date of Patent: May 6, 2008

(54) METHOD AND SYSTEM FOR THE ARCHITECTURE AND IMPLEMENTATION OF A CONSCIOUS MACHINE

(76) Inventor: Robert S. Grondalski, 9601 Corbe Dr., Austin, TX (US) 78726

( * ) Notice: Subject to any disclaimer, the term of this patent is extended or adjusted under 35 U.S.C. 154(b) by 23 days.

(21) Appl. No.: 10/610,108

(22) Filed: Jun. 30, 2003

(65) Prior Publication Data

US 2004/0267802 A1  Dec. 30, 2004

Related U.S. Application Data

(60) Provisional application No. 60/483,813, filed on Jun. 30, 2003.

(51) Int. Cl.
*G06F 17/30* (2006.01)
(52) U.S. Cl. .................. 707/4; 707/1; 707/2; 707/3
(58) Field of Classification Search .............. 707/4, 707/104.1, 1, 102
See application file for complete search history.

(56) References Cited

U.S. PATENT DOCUMENTS

| 5,590,362 A | * | 12/1996 | Baum et al. | ............ | 707/4 |
| 5,920,852 A | * | 7/1999 | Graupe | .............. | 706/26 |
| 6,587,856 B1 | * | 7/2003 | Srinivasan et al. | ...... | 707/102 |
| 6,684,222 B1 | * | 1/2004 | Cornelius et al. | ...... | 707/104.1 |

OTHER PUBLICATIONS

John R. Anderson, "Cognitive Psycology and Its Implications," 2nd Ed, pp. 117-123, published by W.H. Freeman and Company, 1980.
Collins, et al. "Retrieval Time from Semantic Memory" Journal of Verbal Learning and published by W.H. Freeman and Company Verbal Behavior, vol. No. 8, pp. 24-247, published by Bolt Beranet and Newman, Inc. ,1969.
PCT International Search Report on Mar. 4, 2005 regarding PCT/US04/18207 file on Jun. 8, 2004. (3 pgs.).
PCT Written Opinion of the International Searching Authority mailed on Mar. 4, 2005 regarding PCT/US04/18207 filed on Jun. 8, 2004. (7 pgs.).

* cited by examiner

*Primary Examiner*—Don Wong
*Assistant Examiner*—Sheree N Brown
(74) *Attorney, Agent, or Firm*—Peter R. Leal, Esq.; DLA Piper US LLP

(57) ABSTRACT

Systems and methods are described for conscious digital data processing systems. These may include storing data in a set of associated nodes and performing relational operations on this data. In certain instances, the execution of instructions is recorded and new sequences of instructions are synthesized. These recorded instructions may be later spontaneously selected for execution. Values associated with the data may be kept in an array and the behavior of the digital data processing system tailored according to those values.

55 Claims, 9 Drawing Sheets

X Index

|  | 0 | 1 | 2 | 3 |  |
|---|---|---|---|---|---|
|  | Data Type | Source | Relation | Destination |  |
| 0 | 1 | 401 (apple) | 402 (color) | 403 (red) | 0 |
| Y Index  1 | 1 | 401 (apple) | 404 (taste) | 405 (good) | 0 |
| 2 | 1 | 406 (sky) | 402 (color) | 407 (blue) | 0 |
|  |  |  |  |  |  |

Maximum Y index set by total number of links

PRIOR ART

X Index

| | 0<br>Data Type | 1<br>Source | 2<br>Relation | 3<br>Destination | |
|---|---|---|---|---|---|
| Y Index 0 | 1 | 401<br>(apple) | 402<br>(color) | 403<br>(red) | 0 |
| Y Index 1 | 1 | 401<br>(apple) | 404<br>(taste) | 405<br>(good) | 0 |
| Y Index 2 | 1 | 406<br>(sky) | 402<br>(color) | 407<br>(blue) | 0 |
| | | | | | |

Maximum Y
index set by
total number of
links

FIGURE 6 sum array

| | |
|---|---|
| index 400 | 0 |
| index 401 | 1 |
| index 402 | 0 |
| index 403 | 0 | maximum size of sum array set by number of nodes

FIGURE 7

|  | X index 0 | X index 1 | X index 2 | X index 3 | X index 4 |
|---|---|---|---|---|---|
| Y index 1500 | 2 (cntl type) | 2001 (wd-st1) | 2002 (noun) | 2003 (wd-st2) | 210 (setdsrc) |
| Y index 1501 | 4 (cntl type) (constant) | 2001 (wd-st1) | 2004 (verb) | 2005 (wd-st3) | 2006 (subject-verb) |
| Y index 1502 | 2 (cntl type) | 2001 (wd-st1) | 218 (next) | 2007 (wd-st4) | 2008 (subtr1) |
|  |  |  |  |  |  | maximum Y index set by total number of links

FIGURE 9

METHOD AND SYSTEM FOR THE ARCHITECTURE AND IMPLEMENTATION OF A CONSCIOUS MACHINE

RELATED APPLICATIONS

This application claims a benefit of priority under 35 U.S.C. §119(e) to U.S. Pat. application Ser. No. 60/483,813 entitled "Implementation, and Operation of Conscious Machines" by Robert. S. Grondalski filed Jun. 30, 2003; and incorporates fully Disclosure Document No. 532216 entitled "DATA PROCESSING MACHINE" by Robert S. Grondalski filed May 27, 2003. All applications cited within this paragraph are fully incorporated herein by reference.

TECHNICAL FIELD OF THE INVENTION

This invention relates in general to the field of digital data processing systems and more particularly to a data processing systems and methods for performing relational operations on cognitive or control data.

BACKGROUND OF THE INVENTION

A digital data processing system typically comprises three basic elements, namely, a memory element, an input/output element, and a processor element. The memory element stores information in a hierarchy of memory structures of various speeds and capacities including registers, cache, ram, and disk. The information includes data and instructions for processing the data. The processor element accesses the instructions from the memory element and uses them to access and process the data from the memory element. The input/output element allows the input and output of external data, such as, but not limited to, input data from a keyboard and output data to a display device.

The block diagram of a traditional processor element (CPU) is shown in FIG. 1. In a traditional computer's CPU, the data section (20) performs arithmetic operations, such as adding, shifting, multiplying. It is like a fast calculator using binary arithmetic. Memory structures of various speeds and capacities, such as registers, cache, ram, and disk, store the data for the data section. The control section (21) feeds the sequence of instructions to control the data section, including the control of input and output of data. These instructions are like the sequence of buttons we press on a calculator. The instructions are stored in various memory structures, such as microcode memory, cache, ram, and disk. The sequence of instructions is called a subroutine, and these subroutines can call and return from lower level subroutines, which can call and return from other even lower level subroutines, and so on in a hierarchical fashion. The top-level subroutine is the main program. The control section can branch on the result of status information in the data section, such as a negative arithmetic result. The control section also receives interrupts, which interrupt the normal instruction flow and activate interrupt service subroutines.

The processor element includes a processor data element and a processor control element. The processor data element processes data stored in the memory element. For example, it can perform arithmetic operations on the memory data, such as adding memory data. The processor control element accesses the instructions from the memory element and uses them to control the processor data element. The memory element can be viewed as having a memory of data and a memory of instructions. The combination of the processor control element and the instructions in the memory element can be viewed as the control section of the data processing system. The combination of the processor data element and the data in the memory element can be viewed as the data section of the data processing system. The control section sends instructions to the data section to control processing of the data. The data section sends status information back to the control section to allow the control section to branch on the status information.

Prior art digital data processing systems have used these traditional processing techniques and elements to perform operations on data. These types of digital data processing systems, however, have not performed relational operations on this data or adequately emulated certain human behavioral aspects, which are helpful in performing relational operations on data.

Thus, there is a need for digital data processing systems, which are capable of storing a wide variety of relational data, performing relational operations on this data, and emulating human behavior in the processing of this data.

SUMMARY OF THE INVENTION

One or more of the problems outlined above may be solved by the various embodiments of the invention. Broadly speaking, the invention comprises systems and methods for a digital processing system, which utilize a cognitive CPU and learning procedures to emulate human behavior and perform relational operations on data. These systems and methods may employ a cognitive CPU comprised of three sections, a control section, a data section, and an emotional section to achieve conscious behavior patterns. One embodiment of the present invention comprises a method, which stores data composed of a source, a relation, or a destination, and performing relational operations on this data. Another embodiment comprises a system for processing data which includes a memory containing a cognitive data section for storing data composed of a source a relation or a destination, and a control system capable of executing relational operations on the data.

In some embodiments, the data may be control data or cognitive data.

In some embodiments, the source may be a first state, the relation a possible input, and the destination a second state.

In some embodiments, the data section performs relational operations utilizing a plurality of data structures that can be recalled, recognized and learned using data registers.

In other embodiments, the data section may use evaluative heuristics to selectively remove instructions based on frequency and proximity of use.

In some embodiments, instructions are spontaneously selected from memory based upon associated values and executed.

In still other embodiments, the control section refines which instruction sequences should be used to control the data section using self-learning and stored procedural information.

In some embodiments, the hierarchy of the control section allows it to automatically call and return from these instruction sequences.

In yet other embodiments, the control section employs both manual and automatic learning in determining which instruction sequences should be executed.

In some embodiments, the control section may synthesize more complex instruction sequences to handle certain events.

In still other embodiments, the emotion section of the cognitive CPU uses evaluative heuristics to assist the control section in determining which instruction sequences to execute and which data is important.

Embodiments may include an input/output capability, which may automatically learn and recognize input data.

Additionally, systems are presented which embody these types of methodologies in computer systems, hardware, and software that are suitable to implement these types of digital data processing systems.

These and other aspects of the invention will be better appreciated and understood when considered in conjunction with the following description and the accompanying drawings. It should be understood that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 6 is a depiction of the storage of a plurality of data links in an array in memory.

FIG. 7 is a depiction of an embodiment of the storage of values associated with data in an array in memory.

FIG. 9 is a depiction in of the storage of a plurality of control information in an array in memory.

DESCRIPTION OF PREFERRED EMBODIMENTS

Figure 1:
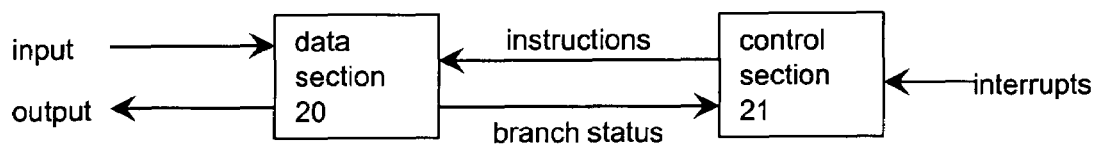
FIG. 1 is a block diagram of a traditional processor.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Attention is now directed to systems and methods for a "conscious" digital data processing machine. A "conscious" machine, as referenced herein, emulates the behaviors commonly associated with the human brain, including the recognition of familiar information, linking newly received sensory inputs with remembered information, reacting to internal emotional states such as pleasure, pain and fatigue, forgetting information, and learning new patterns of complex behavior.

This conscious machine may be composed of a cognitive CPU and input and output structures associated with the cognitive CPU. The cognitive CPU may be in turn composed of three sections, a data section, a control section, and an emotion section. These three sections work in concert with an input and output section to achieve the conscious behavior displayed by the digital data processing systems disclosed herein.

This type of conscious behavior may include performing relational operations between data, executing procedures based upon evaluation of their results, constructing new and more complex procedures based upon the "experience" of previously executed sequences of instructions, and automatically learning and recognizing input data. The data section of the cognitive CPU may be responsible for storing information and performing relational operations between this data. To aid the data section in performing these relational operations, the data is stored as sets of three associated nodes, each containing a source, a relation, and a destination. The control section stores procedural information and is in control of the execution of various series of instructions, while the emotional section applies evaluative heuristics helpful in the functioning of the control and data sections.

As terms such as pain and pleasure are normally applied to the field of human endeavors, and not to the field of digital data processing, a few terms are defined or clarified here to aid in understanding the descriptions that follow. A cognitive CPU is a processing unit composed of three sections: data, control, and emotional. A conscious machine is a machine that displays adaptive and/or associative behavior patterns. Pleasure and pain refer to positive and negative (respectively) results associated with the execution of one or more instructions. Forgetting is the deletion from memory of certain data based upon, e.g., use statistics. Emotion in this context refers to using evaluative heuristics in achieving a conscious machine.

It will be understood by those skilled in the art that the methods and systems described can be implemented in software systems, computer programs, hardware, and any combination thereof. Additionally, the input and output systems of embodiments of the digital data processing systems and methods described may be implemented with a wide variety of techniques, including keyboards, mice, monitors, printers, video cameras, digital scanner, sound cards, microphones etc.

Figure 2:
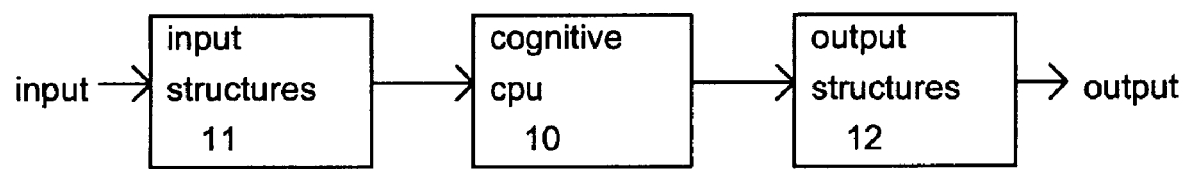
FIG. 2 is a block diagram of an embodiment of a conscious digital data processing machine.

Turning now to FIG. 2, embodiments of a conscious digital data processing machine include three major sections: a cognitive central processing unit (10) which will be referred to below as the cognitive CPU, input structures (11), and output structures (12).

The cognitive CPU is like the CPU of a traditional computer in that it has a data section and a control section, it receives external input data, and sends output data. The cognitive CPU also contains a new section, referred to herein as the emotion section, which does not exist in a traditional computer.

Figure 3:
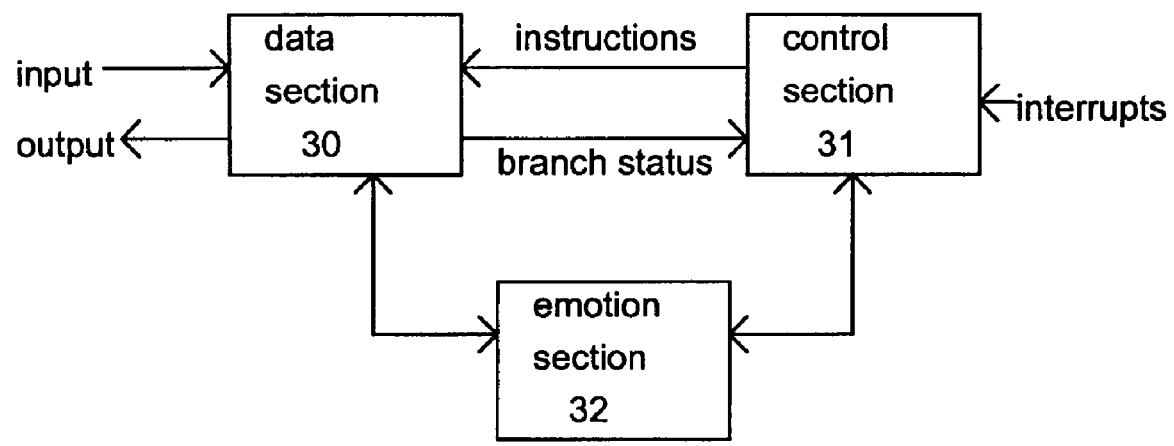
FIG. 3 is a block diagram of an embodiment of a cognitive CPU.

A block diagram of an embodiment of the cognitive CPU is shown in FIG. 3. It is the same as that of a traditional CPU with the addition of the emotion section (32), but there are differences in the operation of the cognitive CPU data section (30) and cognitive CPU control section (31) compared to a traditional CPU.

In a cognitive CPU, the data section (30) usually does not perform arithmetic operations; it performs relational operations between data using registers and data. For example, to access the color of the sky, the cognitive CPU current data source register (DSRC) is set to "sky", the cognitive CPU current data relation register (DREL) is set to "color." The cognitive CPU can then use these registers to access a plurality of information stored in memory to find the data destination of "blue". The cognitive data section (30) can also recognize data, such as when given the relation of "color" and destination of "blue", it can access data that includes "sky".

In one specific embodiment of the invention, the registers described above, and the various other registers in the cognitive CPU, are locations in memory of a traditional computer. Each location is 32 binary bits in size. To move the contents of one register to another, a location in the memory of a traditional computer, said location being associated with the first register, is read and the result written to the location in memory associated with the second register. In another specific embodiment, a hardware embodiment, the various registers are storage elements that are part of an integrated circuit. To move the contents of one register to another, the first register is read onto a bus on the integrated circuit, and the bus data is written to the second register.

In the cognitive CPU control section (31), the sequence of individual instructions that operates the data section (30) is a procedure. Procedures can call and return from other procedures, just as in a traditional CPU subroutines can call and return from other subroutines. The cognitive CPU control section (31) controls the data section (30), as in a traditional CPU, but the procedures it uses may be self learned, and it uses the emotion section (32) to help determine what control procedures to activate. The cognitive control section (31) can branch on the status of the data section (30), such as finding a result, as in a traditional CPU. The cognitive CPU input/output paths receive and send data to the outside world, as with a traditional computer.

The emotion section (32) in the cognitive CPU does not exist in a traditional computer. It receives external pain and pleasure information (e.g., through user feedback) and links it to the data and control sections where it can be recalled to help determine which procedures to perform and to activate important data. It also controls tiredness, which can prevent executing a procedure.

The cognitive data section (30) stores factual information and the cognitive control section (31) stores procedural information. Both sections may be hierarchical. The data section hierarchy allows linking, for example, a specific dog to the general dog idea for attribute access. There are no special data links required to do this. In certain embodiments, the control section (31) hierarchy allows a procedure to automatically call lower level procedures (subroutines) and these to call even lower level procedures, and to automatically return when done. There are special control mechanisms for this. The control section (31) has both automatic and manual learning, while the data section (30) has just manual learning. The control section's automatic learning causes building up more and more complex procedures to handle various situations. These procedures include causing the data section (30) to learn. The control and data sections have automatic forgetting, which exists to free up memory space. It is based on how often and how recently an item of control or data information has been used.

Figure 4:
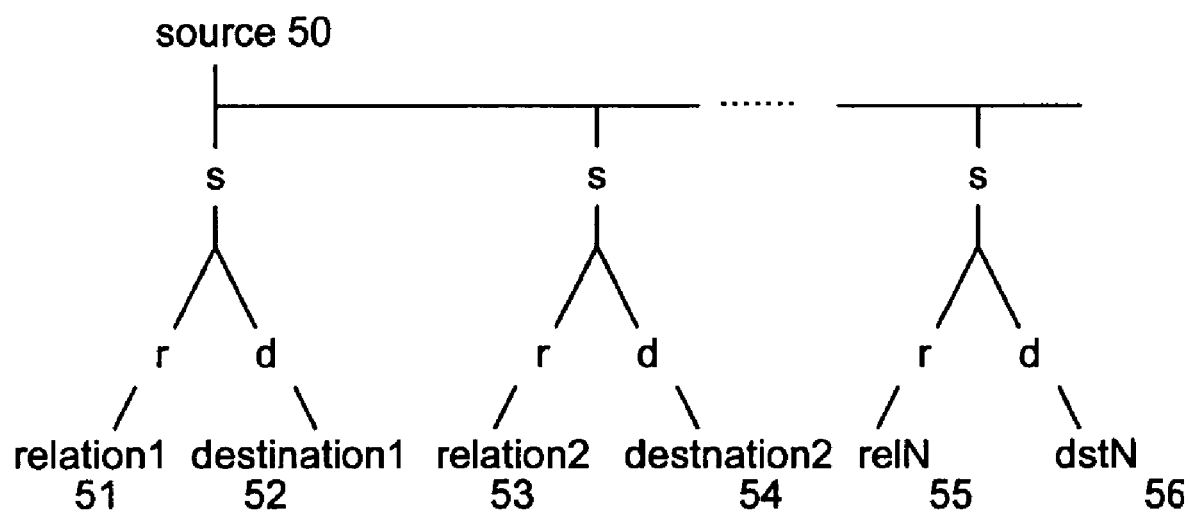
FIG. 4 is a representation of an embodiment of the basic structure used to store data.

The first major section of the cognitive CPU is the cognitive data section (30). The basic data structure used in the cognitive data section (30) is shown in FIG. 4. Each data source node (50) is associated with its attribute(s). Each attribute may be composed of a relation node (51) and a destination node (52). Other examples of relation nodes are nodes 53 and 55; other examples of destination nodes are nodes 54 and 56. It will be shown how this structure can be used for many useful data operations.

A source node (50) and its associated relation node (51) and destination node (52) will be referred to as a link. In a specific example source (50) may be "apple" with one link having the relation (51) "color" and the destination (52) "red", another link may have the relation (53) "tastes" and the destination (54) "good". Each of these links is in turn composed of three sublinks, one between the link and the source, one between the link and the relation, and one between the link and the destination. Each of these sublinks may be considered bi-directional so that any two can be used to find the third.

In certain embodiments, the data section (30) contains a plurality of these links, storing all the data that the data processing machine knows. The data section (30) also contains registers. The data processing machine recalls, recognizes, and learns data links using these registers. The first register is the hold register (300), which contains what the data processing machine currently has most recently activated. There is a group of three other registers—the current data source register (302), the current data relation register (304), and the current data destination register DDST (306), that the data processing machine uses for data link recall, recognition, and learning. To recall an item from the data links, the data processing machine puts attention on something by loading it to the hold register (300). This attention item can be externally input, such as looking at an object or it can be accessed from a previous data link. Once the data processing machine has attention on something, it can be loaded to the current data source register (302), the current data relation register (304), or the current data destination register (306).

Figure 5:
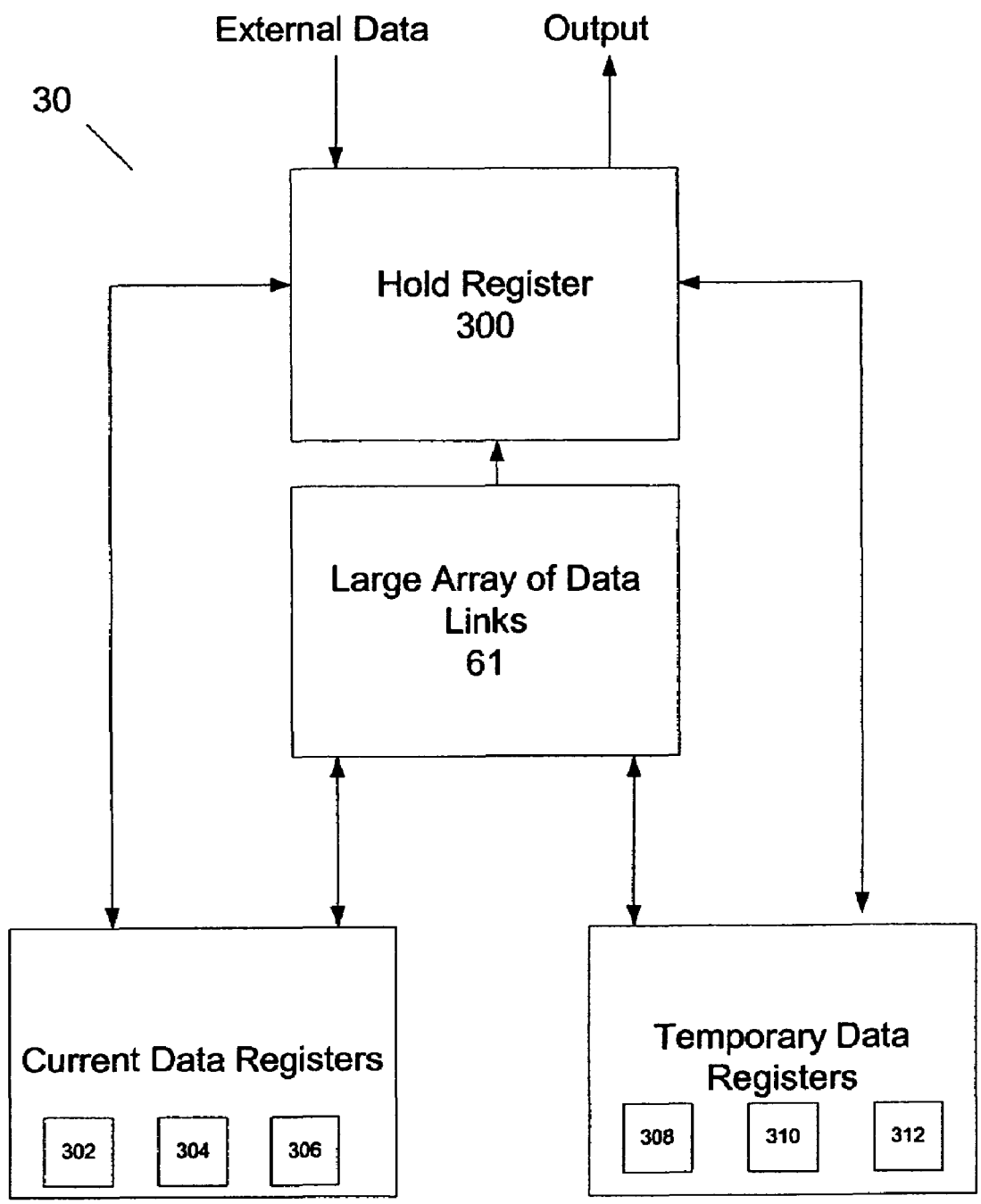
FIG. 5 is a block diagram of an embodiment of a data section.

Referring now to FIG. 5, a block diagram of an embodiment of the data section (30) is depicted. There is a large array of data links (61), each with a source, a relation, and a destination. This array (61) can be accessed with the current data registers (302,304,306) and the results stored in the current data registers (302,304,306) and hold register (300). The array can also be accessed with temporary data registers (308,310,312) and the results stored in the temporary data registers (308,310,312) and the hold register (300). The hold register (300) can also be loaded from or to any of the current data registers (302,304,306) or the temporary data registers (308,310,312). The organization of data section (30) is depicted.

For example, to recall the color of an apple, the data processing machine first sets the data source register (302) to "apple", then sets the data relation register (304) to "color", then accesses the destination using the instruction data relation access (DRELACC). This and all other instructions may be activated by the control section (31). The DRELACC instruction uses the registers to access the millions of data links stored in the data section (30) and puts the result in the hold register (300) HOLD. Once the answer, "red" is loaded to the hold register (300), it can then be loaded from the hold register (300) to the data source register (302) to, for example, say the word "red" by accessing the destination with the data relation register (304) set to "word". All this loading of registers is performed by the control section (31) as it controls all data section (30) operation.

In one specific embodiment, the plurality of data links is stored in an array in the memory of a traditional computer as shown in FIG. 6. The array has an X dimension and a Y dimension. The X dimension of the array is five with values of 0 through 4 and the Y dimension is determined by the number of total links. Each node of the above example is assigned a number. For example "apple" is assigned number 401, "color" is assigned 402, "red" is assigned 403. Each element in the array is 32 binary bits in size allowing for 4 billion unique nodes.

The first of the five X locations stores a value that indicates this link is a data type link. In one embodiment, the data type value is "1" for all data links (other link types may have different values depending on the type of data and/or relation they represent). The second of the five X locations associated with each link stores the source node (50). In this example the value 401 is associated with "apple". The third of the five locations associated with each link stores the relation node (51). In this specific example the value 402 is associated with "color". The fourth of the five locations associated with each link stores the destination node (52). In this specific example, the value 403 is associated with "red". The fifth of the five locations associated with each link is left blank in this embodiment for data type links, but will be used with control type links described in the control section (31) description below. Each of the various data registers is 32 binary bits in size.

To recall the color of an apple, the current data source register (302) is loaded with the value 401 and the current data relation register is loaded with the value 402. When the DRELACC instructions is activated, the software on the traditional computer sequences through the plurality of data links stored in the memory of the computer and compares the values read from the memory with the values stored in the current data source register (302) and current data relation register (304). Once a match is found to both registers, the result is loaded to the hold register (300). The instruction TRELACC operates in a similar way, but uses the temporary data source register (308) and temporary data relation register (310). The instructions DDSTACC and TDSTACC, explained below, also operate in a similar way but use the relation and destination registers. It will be appreciated by those skilled in the art of computer software that presorting the array in numerical order will improve the speed of searching for a match. It will also be appreciated that a content addressable memory may be used for searching for matches.

For example, the data processing machine may have the question input "What is red and tastes good?". It recognizes "apple" as follows. First it does the instruction clear sums (CLRSUM is the abbreviation), which sets all the millions of sums associated with data source nodes to zero. Then it sets the current data relation register (304) to "color", and the current data destination register (306) to "red". Then it performs the data instruction sum attribute (SUMATR). The apple node sum and any other red object (such as a fire truck) sum will have a value of 1. Then it sets the current data relation register (304) to "taste" and the current data destination register (306) to "good" and performs another SUMATR. "Apple" will now have a sum of 2. It then performs the instruction select maximum sum (SELMAX) and "apple" can be selected and will get attention and get loaded to the hold register (300). It is also loaded to the data source register where it can be used to access other attributes, such as size, or location, or how to output it. From the hold register (300), it can then be used to load to another data register if desired. If there is a tie (such as with tomato), then the data processing machine picks the strongest source node based on recency and frequency of use of the data link, but then with each SELMAX it selects the next node with the same sum. This allows it to, for example, access "apple", then it can step to "tomato", and on to other red objects (strawberry . . . ) that taste good.

In an embodiment using a traditional computer, the sums described above are stored in an array stored in the memory of the computer as shown in FIG. 7, the sum array. The node number is used as an index into the array to access the sum. For example, each element in the array is set to 0 when the instruction CLRSUM is activated. Next, if the current data relation register (304) is set to 402 (the number associated with color), and the current data destination (306) is set to 403 (the number associated with red), then when the instruction SUMATR is activated, the array structure in FIG. 5 is searched for a data link that has a relation node that matches the current data relation register (304) and a destination node that matches the current data destination register (306). When a match is found, the source node (50) is used as an index value for the sum array and this element in the sum array is incremented. In this case the sum array element number 401 would be incremented. When the instruction SELMAX is activated, the element with the maximum value is selected. The case of a tie is explained below. In another specific embodiment, a hardware embodiment, the sum array and the various other arrays in the cognitive CPU can be stored as an array of storage elements that are part of an integrated circuit.

The data processing machine may have two versions of each of the three data registers described above. Instead of just a current data source register (302) (DSRC), it also has a temporary data source register (308), which will be referred to as TMPSRC. Likewise, it has a temporary data relation register (310) which will be referred to as TMPREL and a temporary destination register (312), which will be referred to as TMPDST. These temporary registers are used to access the data links while holding other data register values. For example when accessing something, such as "what is the color of an apple?", a data source register must be set to "apple", then the relation "color" must first be accessed before accessing the color of an apple. The same data source register cannot do both. One source register, the temporary data source register, can access the parsed sentence structure of multiple links that it has created as it understood the sentence "what is the color of an apple?". This structure of links looks as follows (note for ease of reading a tabular format is used in table 1; the 1 at the beginning of the line indicates it is a data type link; control, sound, constant types etc. may have different values):

TABLE 1

| | parsed sentence structure | | | |
|---|---|---|---|---|
| | source | relation | destination | |
| 1 | story1 | subject | apple | ; |
| 1 | story1 | adjective | color | ; |
| 1 | story1 | verb | is | ; |

The control section (31) knows how to answer the question by setting "story1" as the temporary data source register (TMPSRC) by using the instruction SETTMPSRC, then setting "subject" to TMPREL and finding "apple" using the instruction "temporary data relation access" or TRELACC. The result, if found (apple), is stored in the hold register (300). The control procedure receives the "find" branch status and then moves the hold register (300) to the current data source register (302) using the instruction (SETDSRC), then sets "adjective" to TMPREL (310) and accesses "color" using TRELACC and sets it as the current data relation register (304) using the instruction set data relation (SETDREL). Finally the answer "red" is accessed with the current data registers by using the instruction current relation access (DRELACC). In this example, the use of the current and temporary registers is interchangeable. The control section (31) produces the "subject" and "adjective" ideas as constants, which will be described later in the control section (31). The control section (31) learned this procedure and other procedures through trial and error and later through manual learning, once the data processing machine learned how to learn procedures. Successful procedures are reused, the result of a control section (31) selection. Control procedures that work are reused by the system; those that do not are forgotten because of lack of use.

In the tabular format above, there is a separate attribute pair stored for each use of an attribute. For example, the attribute pair color/red is not used for each object that is color/red; a new attribute is stored for each one. This speeds recognition because there is no need to search for and find an attribute pair during recognition. It should be noted that storing attributes instead of relation and destination could be used to save memory space in an implementation, but for this particular embodiment there will be a separate attribute stored for each use of an attribute.

To set the various data registers to the value in the hold register (300), the data processing machine uses the instructions below in table 2:

TABLE 2 instructions to load the hold register (300) to various data section registers set current data source register (302) (SETDSRC)
set current data relation register (304) (SETDREL)
set current data destination register (306) (SETDDST)
set temporary data source register (308) (SETTMPSRC)
set temporary data relation register (310) (SETTMPREL)
set temporary data destination register (312) (SETTMPDST)

To load the various data registers to the hold register (300), the data processing machine use the instructions below in table 3:

TABLE 3 instructions to load various data section registers to the hold register (300)

current data source register (302) to the hold register (300) (SRCTOHLD)
current data relation register (304) to the hold register (300) (RELTOHLD)
current data destination register (306) to the hold register (300) (DSTTOHLD)
temporary data source register (308) to the hold register (300) (TSRCTOHLD)

TABLE 3-continued instructions to load various data section registers to the hold register (300)

temporary data relation register (310) to the hold register (300) (TRELTOHLD)
temporary data destination register (312) to the hold register (300) (TDSTTOHLD)

In one specific embodiment, these registers are locations in the memory of a traditional computer. To perform an instruction, such as SETDSRC, the value in memory associated with the hold register (300) is read and then written to the value in memory associated with the current data source register. In another specific embodiment, a hardware embodiment, these registers are storage elements that are part of an integrated circuit. The instruction DSRCTSRC loads the current data source register (302) to the temporary source register (308).

It will be appreciated by those skilled in the art that these data structures, representations, and techniques can be used to store, recall, recognize, and perform operations on an almost infinite variety of relational data. For example, the story "the man went to the movies" could be stored as shown:

|   | source | relation | destination |   |
|---|--------|----------|-------------|---|
| 1 | event2 | subject  | man         | ; |
| 1 | event2 | verb     | went        | ; |
| 1 | event2 | object   | movies      | ; |

Family Relationships may be stored as:

|   | source  | relation | destination |   |
|---|---------|----------|-------------|---|
| 1 | Jetsons | father   | George      | ; | and Multiplication tables as:

|   | source | relation | destination |
|---|--------|----------|-------------|
| 1 | 2x     | 2        | 4           |
| 1 | 2x     | 3        | 6           |

The data section (30) may also have manual learning. In some embodiments, there is no automatic learning because the control section (31) may need to determine when it is appropriate for the data section (30) to learn. The control section (31) may additionally have automatic learning, which helps learn these complex procedures. Manual learning is when the data processing machine decides to learn something, such as apple/color/red (this is an abbreviation for source/relation/destination of a data link).

The data processing machine manually learns in the data section (30) by taking whatever has been set in the three current data registers and learns a new link when executing the instruction data learn (DLEARN). In one embodiment, learning can only happen with the current data registers. Only the temporary data registers are used in this instance for recognition. The data processing machine can recall with both the current and temporary data registers (as with the apple example above).

In one specific embodiment, when the instruction DLEARN is activated by the control section, with reference to FIG. 5, a new link is added to the array of links, with a data type of "1", a source node using the value in the current data source register (302), a relation node using the value in the current data relation register (304), and a destination node using the value in the current data destination register (306).

The data processing machine manually creates a new data node with the instruction CRDAT. The new data source is loaded into the hold register (300). This is used, for example, when a new object is encountered and it is desired to link attributes to it or when there is a new event in a story.

In one specific embodiment, a state in use array, similar to the sum array in FIG. 6, is used to keep track of nodes in use. A "0" in the array indicates an unused node. When the CRDAT instruction is activated by the control section, a search is done of the array for an unused node and the first unused node that is found is used for the new node being created with the CRDAT instruction. This location in the array is changed to "1" (in forgetting, nodes can change back to being unused with a value of "0").

If the data processing machine tries to learn a data structure where the data source register matches an existing data source, and the data relation register matches an existing data relation, and the data destination is different from the existing data relation, then it overwrites the existing data structure. For example, if the data processing machine has stored in its memory the data link shown:

| | source | relation | destination | |
|---|---|---|---|---|
| 1 | apple | color | orange | ; | and it tries to learn the link:
apple/color/red

| | source | relation | destination | |
|---|---|---|---|---|
| 1 | apple | color | red | ; | then the existing data structure is overwritten with the new information. This is useful in situations where facts keep changing. For example, a car race where the car in first place keeps changing. Initially it may be as shown:
initial car race link (red car in first place):

| | source | relation | destination | |
|---|---|---|---|---|
| 1 | story4 | frstplace | red_car | ; |

Later it may change to the link:
updated car race link (blue car in first place):

| | source | relation | destination | |
|---|---|---|---|---|
| 1 | story4 | frstplace | blue_car | ; |

At any point in time, the data processing machine will access the correct answer when it accesses which car is in first place. To recall the order of first place cars, events stored in the data section would be recalled.

During recognition, the data processing machine stores the attributes it is using for recognition and later it can learn all of them with a single instruction. For example, if it is looking to recognize what is color/red and sound/siren, it will recognize a fire truck. But if it inputs different attributes and it does not recognize anything, then it may want to create a new data source node and link it to all of the attributes it has just input. It can do this with the instruction learn attributes (LRNATRS).

In one specific embodiment, at each SUMATR the value of the temporary data relation register (310) and the value of the temporary data destination register (312) are stored in array in the memory of a traditional computer, with each consecutive SUMATR using the next pair of sequential elements in the array. A counter is incremented with each SUMATR and is used as an index pointer for the array. The counter is cleared when the CLRSUM instruction is activated by the control section. When the LRNATRS instruction is activated by the control section, the data stored in the array is written to the link memory. A new data source node is selected (the next sequential unused node) and it is linked to each pair of relation and destination nodes stored in the array.

There are times we want to block certain ideas from being selected by SELMAX. For example, if the data processing machine is asked to name all trees except pine and oak trees. In this case, the data processing machine sets the temporary data relation register to "is a", and the temporary data destination register to "tree", then it does SUMATR. It can then put attention on pine, before doing SELMAX and the instruction BLOCKSUM, then put attention on oak and do the instruction BLOCKSUM. This sets a large negative number on the sum, so at SELMAX a tree type other than pine or oak will be selected.

In one specific embodiment, with reference to FIG. 6, the sum array has the value −10 set as the sum associated with the value in the hold register (300) when the instruction BLOCKSUM is activated by the control section.

Sometimes, the most recent results of a SUMATR operation is wanted. Other times, we may want to access items we have not accessed recently. For example, the data processing machine may be asked to name trees it has not output recently. It can do this by doing a SUMATR as above, and then doing the instruction SUBRCNT, which reduces the sum of data sources that have been recently activated.

In one specific embodiment, a register stores the current cycle number. It is incremented with every new control state. An array similar to that in FIG. 6 stores an array of cycle counts. This array is the "lastuse" array. At each cycle, whatever is in the hold register (300) is used to index the lastuse array and the value of the cycle count register is written into that location in the lastuse array. When the SUBRCNT instruction is activated, all sums in the sum array that are associated with a cycle count within the last 5000 cycles are set to zero.

Sometimes we just want to select random results of a SUMATR operation. For example, we may want the data processing machine to name all colors in any random order. We use the instruction select maximum sum randomly (SELMAXR). In the case of naming trees, there are many sums with the same maximum value. The SELMAXR instruction will select from these randomly. The SELMAXR instruction is also used with the random instruction mechanism used to initially find useful sequences of instructions. In one specific embodiment, the SELMAXR instruction uses a pseudo-random number to select from any of a group of equal sums.

For example, if the data processing machine is asked "what is not red and is a fruit", then it uses the subtract attribute (SUBATR) instruction. This instruction reduces the sum by 1 for any source that matches the attribute set in the temporary data relation register and temporary data destination register. This is used less frequently than the SUMATR instruction, but it is nevertheless needed. The data processing machine can set color/red and do SUBATR, then set is a/fruit and do SUMATR, then SELMAX to find an answer. In one specific embodiment, the value in the hold register (300) is used as an index for the sum array and the element in the array found with this index is decremented by 1 when the SUBATR instruction is activated by the control section.

Each time the data processing machine recalls or recognizes, the result is fed to the control section (31). The result is also stored in the hold register (300) for use later, to allow it to be loaded to a data section (30) or control section (31) register. Attention is what is held in the data section hold register (300). The data section (30) can learn by moving the hold register (300) value to the data source, relation, or destination registers followed by a DLEARN instruction.

The second major section of the cognitive CPU (10) is the cognitive control section (31). The cognitive control section (31) is used to store and execute procedures, which are sequences of states that activate individual instructions, procedure calls, and constants. The individual instructions control the input of data, the processing of data in the data section (30) and other sections, and the output of data. Procedure calls activate other procedures in a hierarchical fashion. When performing instructions in the control section (31), the data processing machine is not focusing on the instructions—these occur as it automatically moves from state to state; it focuses on data. Besides individual instructions and procedure calls, the sequences can directly activate ideas (constants) that can then be loaded into the various registers.

An example of control section (31) operation is adding. The first adding state is a procedure call to a procedure "get next digit", the next state is "add it to total". When executing the first state, it activates the procedure "get next digit", which is a sequence of states that includes procedure calls which activate lower level procedures until it reaches a level that operates internal registers (elemental instructions). This pushing down is automatic when a procedure call is encountered. Returning (popping up) is automatic when the last state in a procedure is finished. Note that when adding the data processing machine does not focus on the instructions of adding, but on the data (for example 5+2=).

The data processing machine may automatically learn a new step (state) in a procedure whenever it manually starts a procedure, an instruction, or sets a constant. For example, it learns the above adding procedure by first manually activating the procedure "get next digit", followed by manually activating the procedure "add it to total". It had earlier learned the steps in these procedures. This way, the data processing machine is constantly building up more and more complex procedures to handle various situations.

In one embodiment, once a procedure is started, the only way to stop it is to interrupt out of the procedure, since the control section (31) automatically moves from state to state, and automatically pushes and pops. There are many interrupts, such as "loud sound", pain, boring, etc. These move to service procedures where the data processing machine can decide what to do. The decide procedure is one of the most frequently used procedures. It is used to determine what to do next based on goals, plans, emotion levels associated with data and procedures, etc.

The control section (31) is based on states. At any one time, only a single control state is active. The most common relation between states is "next". This moves the control section from state to state as each instruction is performed. Ideas can also cause states to move. For example, branch status information from the data section (30), such as finding a destination during recall. Any data in the hold register (300) can be used to move from state to state. For example, when the data processing machine recognizes input data in the hold register (300), it can be used for moving from state to state. As the control section (31) moves to a new state, one or many outputs can activate. These outputs can be instructions, constants, or procedure calls.

The control structure may be very similar or identical to the data structure. In the data structure we have source, relation, and destination data. In the control structure, we have a source state, a relation between states, and a destination state. In the control section (31), we also have an additional item, the output. This output is optional and can be an instruction, a procedure, or a constant. Multiple outputs from a state are allowed. The data structure may operate based on instructions from the control structure, while the control structure may move from state to state. This movement can be based on what is in the hold register (300), branch status, or the value "next".

Figure 8:
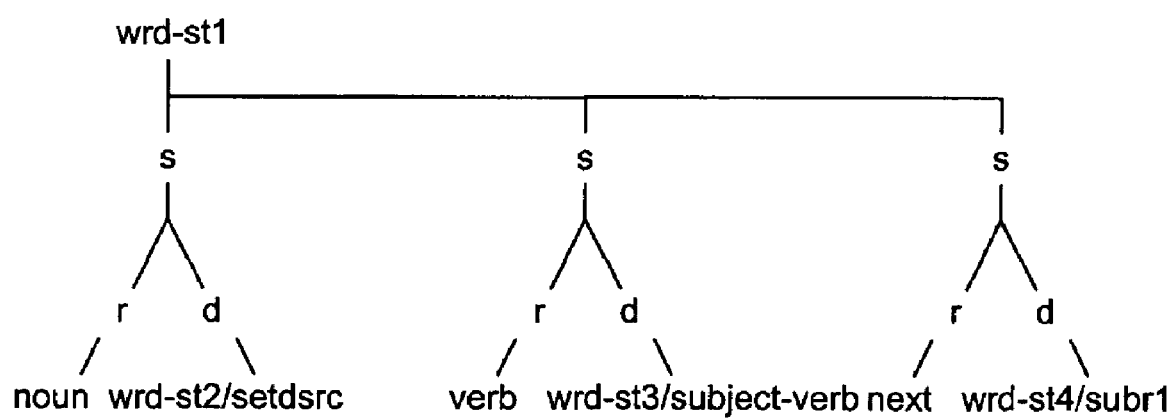
FIG. 8 is a representation of the an embodiment of the basic structure used to store control information.

A specific example of this is depicted in FIGS. 8 and 9. If the data processing machine wants to execute the elemental instruction SETDSRC if it is a noun, then it first inputs the word, then sets relation to wordtype, then does DRELACC in FIG. 8, and if a noun it activates SETDSRC and moves to state wd-st2. If it is a verb, it activates the constant "subject-verb" and moves to state wd-st3. If it is not a noun or a verb, then it takes the "next" branch to do the procedure "subr1" to access another word. The first branch taken has priority over subsequent branches.

In the specific embodiment depicted in FIG. 9, the control data is stored in the same array of information that hold the data links. Each control state is assigned a unique node number. For example, the state wd-st1 is assigned 2001. This node number 2001 can also be used in data type links to, for example, recall the start of a control sequence to execute that control sequence. Each cycle the data in the hold register (300), or the value "next", or branch status information, is used to select a new state to move to. If the hold register (300) contains 2002 (the node number associated with noun), then control sequence moves to state 2003 (the state node associated with wd-st2) and activates the elemental instruction SETDSRC. The control sequence moves to a new state by searching the array of links for a match between the current state and the source state in the link and a match between the hold register, or "next", or branch status information, and the relation node in the link. This is done using a traditional computer by sequencing through the link array and looking for matches.

The search in FIG. 9 is from top to bottom and the first link that matches is selected. If the hold register (300) has a value of 2004, the node number assigned to "verb" in this example, then since this is a link type 4, or constant (explained in detail below), the state output 2006 (subject-verb) is loaded to the hold register and the control moves to state 2005 wd-st3. If the hold register (300) does not have a value of 2002 or 2004, then the "next" branch is activated because 218 (next) is always active and the priority of braches may be top to bottom. The "next" branch activates the procedure 2008 (subr1) and when this procedure is complete it automatically returns to the state 2007 wd-st4 and proceeds from there. This demonstrates the 3 types of outputs from a state: elemental instruction (the most common type of output), constant, or procedure (there can also be no output, just movement from state to state). Elemental instructions are each assigned a value in the range 200-350, which makes them easy to identify from procedure call instructions. Note that procedure state outputs, or any state other type of state output, can use any value for the state link relation node, it does not have to be "next". If the "next" link 218 above did not exist and no next state from 2001 was found, the stack would be popped. If the stack is popped and the stack pointer is already at the top of the stack, then the interrupt PPOPNEG activates and the next control state is the start of the interrupt service state sequence. In one specific embodiment, this interrupt service state is node number 1. In one specific embodiment, the procedure (subroutine) stack has a size of 16.

An automatic low level procedure continually moves the control section (31) from state to state if there are elemental instructions or constants, and automatically pushes down to procedures and automatically pops when done a procedure (no next state). The instructions are procedure push (PPUSH) and procedure pop (PPOP). It allows mixing of elemental instruction state outputs and procedure outputs (calls) in a string of states. States can move based on data or just "next", which occurs when a state is finished its output.

If the control section (31) encounters a state, and no next state activates when it is done the current state, then it is the end of a procedure, and the data processing machine returns to the state in the calling procedure. If it is at the top of the procedure (subroutine) stack, then there is no place to return to, and it activates the interrupt "procedure pop pointer negative" (PPOPNEG), which goes to the PPOPNEG control service procedure to determine what to do next.

In many embodiments, there are 3 types of control section (31) procedure learning: Automatic—when a procedure is manually activated with the action EXECUTE from the control section (31) then automatically create a step (state) in a new procedure. Manual—when the data processing machine manually load the procedure learn registers, and spasm—when a random instruction occurs (this allows learning the instructions the data processing machine is capable of doing). If a new procedure produces a good result, the emotion section (32) links "goodgoal" to it biasing it for future recall.

A new control procedure for learning may be created when: the create new control (CRACTL) instruction is asserted by the control section (31), when an instruction is manually executed and a manual execution has not occurred in a while, or the current procedure is getting too long (over a certain number of steps)

The first state of the new procedure is stored in the procedure learn source register (36B) (PLSRC). At each new manual execution, a new state is learned—the new state becomes the new PLSRC (36B) and it is linked with "next" to the last state. When a new procedure is created, it is automatically learned in the data section (30) with the link: source=the new procedure/relation=is a/destination=procedure. This allows it to be selected as a procedure in the data section (30) for linking attributes, such as what it is good for. A register named control start (CTLSTART) is loaded with the first state of a new procedure. The data processing machine can access this value in the data section (30) to link more data information to the start of the procedure, such as if the procedure is a good procedure to help recall it if the data processing machine is trying to decide on something good to do. To re-execute a newly learned procedure, it can execute STRTCTL, which loads CTLSTART, the start of the new procedure, to the procedure source register (PSRC), which starts it running. This STRTCTL action is useful to redo a procedure that produced a good result. The PSRC register stores the current state that is active in the control section.

Procedure learning may straddle the line between the data (30) and control section (31). Information moves back and forth between the two, which makes procedure learning more difficult to understand than simple data section (30) operation or control section (31) operation. Attention is put on a data item associated with an instruction, for example on a "get a number" when preparing to add. The data processing machine focuses on it as data, then executes it by the control outputting the action EXECUTE along with the hold register holding "get a number". Whenever the data processing machine executes something, it is learned as a procedure step. This automatic mechanism for learning is necessary otherwise procedures would never exist because non automatic procedure learning requires procedures to learn other procedures. There must also be mechanisms to add branches to a procedure, correct a procedure, and put constants in a procedure. To do so requires accessing procedural information as data. When procedural information is accessed as data, other procedures are used to do so. When a new procedure is finally correct, the start of it can be selected as data, and then be executed.

An example of the data processing machine learning a procedure is to input a number then output it. It executes the procedure step to read the number. This causes the first step to be learned. It then executes the procedure to output it and this step is learned. It can now redo this new two step procedure any time by focusing on the start of it (which puts it in the hold register) and executing it. Often the sequence of steps for a new procedure is worked out first as a data sequence and then recalled and executed step by step. As this occurs, the new control procedure is created.

In one specific embodiment, there are four registers in the control section, the procedure learn source register (PLSRC), the procedure learn relation register (PLREL), the procedure learn destination register (PLDST), and the procedure learn out register (PLOUT). The procedure learn destination register initially contains the last new state that was learned. When the EXECUTE instruction or the procedure learn (PLEARN) instruction is activated by the control section, the procedure learn destination register is copied to the procedure learn source register. The procedure learn relation register is set to the value "next" unless there is a branch, explained below. The state in use array, explained above, is searched to find a new node number to use to identify the new state, and when one is found, it is written to the procedure learn destination register. The value of the hold register (300) is written to the procedure out register. Then a new line is then created in the array of links shown in FIG. 9. The link type is set to "2" indicating it is a control type of link. The values in the four procedure learn registers are written to the new line in the array. If this is an EXECUTE instruction, the hold register (300) will contain what is about to be executed. In the case of an EXECUTE instruction, this hold register (300) value can be the start of a procedure or an elemental instruction. In this way a new step in a new procedure is automatically learned by the control section. When the constant learn (CLEARN) instruction is activated by the control section, then the link type is set to "4" in the above learning of a new link and the hold register (300) contains the constant to be learned in the new procedure step. If the new state being learned is the first state in a new procedure, it is linked to is a/procedure and its value is stored in a control start register for later use to reactivate this new procedure if it is a good procedure.

Automatic procedure learning may be effortless: the data processing machine learns states as it manually enables instructions. The control section (31) eventually learns to learn data structures as the data processing machine experiences them, and it then creates levels of data structures as it understands them.

As described above, control procedures may be learned with separate control registers PLSRC, PLREL, PLDST, PLOUT. Once learned, control procedures can operate automatically and sub-consciously. The control section (31) is always storing a sequence of control as the data processing machine manually enables steps. This sequence is soon forgotten if it does not recall it.

The data processing machine may automatically learn a control instruction sequence (procedure) while using another existing control instruction sequence (procedure) to manually access the instructions and data to do an operation. Once it works, it can execute the new control procedure and not think about the instructions. It does this by learning in the background so it has the current executing control procedure and the learn (background) control procedure. The current procedure registers are PSRC, PREL, PDST, and POUT. The procedure learn registers are PLSRC, PLREL, PLDST, and PLOUT. The current procedure registers update as the control section (31) moves from state to state. The procedure learn registers update only when the control section (31) learns a new step or when it recalls procedure steps.

The data processing machine can start a procedure by accessing the data section (30) to select the data node of the procedure, then it activates the instruction EXECUTE. This takes whatever is in the hold register (300) and uses it as a control sequence starting point. The low level procedure starts a procedure with set procedure source (SETPSRC), which loads the procedure source register PSRC. SETPSRC is like a jump. To be able to return, the instruction set procedure/push source (SETPPSRC) is activated and pushes the calling location on the stack where it can be used for a later return.)

As can be seen, the structures of the control and data sections may be quite similar or even identical. Both have a source, a relation, and a destination. A destination state is activated in the control section (31) when a proper relation is activated. A data section (30) destination is activated in the data section (30) when a proper relation is activated and the destination is accessed. The data section (30) may be an evolutionary mutation copy of the control section (31) since the sections are similar and while a control section (31) can exist by itself a data section (30) usually needs a control section (31) to operate it.

The third and final section of the cognitive CPU (10) is the emotion section (32). It is not only important to understand how the data processing machine thinks, but to understand why it thinks about things. The emotion section (32) is responsible for the data processing machine thinking about useful things, for self-organizing, for it being functional. Without emotions, there would be no way to initially determine what it should do from the myriad of things the data processing machine is capable of doing. Everything would be equally important. Instructions would be without reason. There would be no desire to understand. Once the data processing machine organizes its thoughts, it has less need of emotions, as it can rationally decide to do things, but this rationality is a result of emotions biasing its early thoughts. (It should be kept in mind that emotion, rationality, and other such terms are used here in the context of the adaptive behavior of the data processing machine.)

Doing good things produces pleasure, doing bad things produces pain. Pain interrupts the data processing machine's thoughts and interferes with getting pleasure. Emotions bias the selection of good procedures. Random new procedures that it learns that do not produce a good result are not biased and thus not reactivated and are eventually forgotten. This natural selection results in the retention of only useful procedures. When it is confused, it gets no pleasure and pain eventually occurs.

When the data processing machine evaluates performing a procedure, the data processing machine evaluates its result versus its effort. If multiple procedures produce the same result, then it picks the easiest first because it gets pleasure from the result and there is the least pain of the effort doing it. As a result of this, if it considers picking apples from a tree, it first picks the easiest to get, even though the result is the same for all apples. Note that it can force itself to do the most difficult first if it decided there is a reason to do it (for example, more exercise if exercise is the goal). Evaluation of result versus effort is learned as a result of the pain and pleasure emotions.

Before the data processing machine starts a procedure, it evaluates how tired it is. If it is very tired, it just waits. If somewhat tired, it evaluates the effort of performing a procedure versus its tiredness. Since doing a procedure makes it tired, the result is that it tends to perform short easy procedures and to pick the most efficient procedures to reach a goal. Tiredness helps it find efficient procedures. The tuning of the tired register is important. If the machine is too tired, it does not do enough. If the machine is too active, it just does anything and does not learn useful procedures because it just jumps from procedure to procedure. Danger eliminates tiredness and it starts the execution of situation based procedures.

Emotions are the result of moving to state nodes (which the data processing machine has learned) associated with each type of emotion. This movement is directly or indirectly a result of pain and pleasure interrupts. Pleasure interrupts are those that occur at a low frequency and can temporarily block pain interrupts because the pain/pleasure level is at pleasure. Pain tends to be interrupts that can occur excessively and that cannot be ignored.

In some embodiments, the main mechanisms for emotions are various levels of pain interrupts and pleasure interrupts which interrupt the control section. The data processing machine has an internal pain/pleasure level stored in the pain/pleasure register, and when it reaches the pain interrupt thresholds or pleasure interrupt thresholds, it gets either a pain or pleasure interrupt. Pain and pleasure occur in a number of ways. The most obvious way is externally—it is input with external pain (something hurts) and it is input with pleasure. Pain and pleasure occur internally also. If it accesses data that it has not accessed in a while, or executes a procedure that it has not executed in a while, it gets pleasure. As it gets pleasure, it moves the pain/pleasure level toward pleasure, and if it reaches a pleasure interrupt threshold then it gets a pleasure type of interrupt. Internal pain occurs when it gets bored with what it is doing. This happens because every so often it increases pain and if there is not pleasure from what it is doing it will eventually get a pain type of interrupt (intlowpn) as the pain/pleasure level reaches the boring pain threshold. Executing procedures that do not produce pleasure eventually causes pain, and the effort of starting a procedure increases the pain level. In general, work increases pain unless there is a corresponding reward. Recalling painful data increases the pain level.

At pain and pleasure interrupts, the data processing machine flow of control states is interrupted and it automatically links the pain/pleasure level to the current procedure being executed. This is used to later inhibit the re-executing of painful procedures. Whenever it attempts to execute a procedure, the pain/pleasure level is restored and can interrupt immediately. It uses the instructions current goal to hold (CURGOALHLD) and control start to hold (CSTRTHLD) to access the current procedure being executed and the current procedure being learned. It also automatically links goodgoal or badgoal goal types to a procedure. After linking the pain/pleasure level and the goaltype, it proceeds to the decide procedure, which decides what to do next. The decide procedure uses these goaltype values in its decision process. Note that there are many interrupt types but only pain and pleasure types produce goal type links.

The data processing machine can force itself to do painful procedures by using the OVERRIDE instruction. This allows it to do procedures that would normally be inhibited by getting a pain interrupt as it tries to start them. It can only OVERRIDE for a short time or until the pain level gets too high. Once it does an OVERRIDE, it must wait for a while before it can OVERRIDE again—otherwise it could just keep overriding painful procedures. It experiences disappointment when it does an OVERRIDE and the OVERRIDE eventually times out, and if there is no pleasure yet then it gets a large pain interrupt (possibly throbbing). An example of the use of OVERRIDE is when it is reading. The data processing machine may get bored with it and stop after it gets a pain interrupt. Later, it may want to start reading again. It must OVERRIDE to start reading again because it ended with a boring (pain) interrupt the last time. As long as it starts getting pleasure from what it starts reading then there will be no other boring (low pain) interrupts.

The pleasure interrupts are not actual interrupts because we do not want the data processing machine to stop a good procedure with an interrupt; when pleasure occurs, it waits until it is finished with what it is doing before it goes to the pleasure procedure, which links goaltype/goodgoal to the procedure that just finished. This goaltype/goodgoal is used later by the decide procedure to help decide what to do.

The decide procedure picks the best procedure to do based on what has resulted in good results in the past, and based on the current situation. In other words, if it is doing a good procedure, it does not pick any other good procedure—it keeps the original good procedure because of the current situation. It should be noted that the decide procedure can activate other procedure that are learned that help with deciding what to do.

In one specific embodiment, to implement the emotion section mechanism that biases good control procedures, the procedure for selecting good procedures is stored in the control section. This procedure to select good procedures is not learned, it is preprogrammed, and it cannot be forgotten. The links to goodgoal, goodbadgoal, badgoal, etc. are learned as data links and are accessed by the procedure for selecting good procedures.

The control section (31) must keep running so it is always doing something. But what if it gets stuck in a loop? For example, it may input the same sentence over and over. The way the data processing machine avoids being permanently in a loop is that it eventually get a boring (low pain) interrupt when no pleasure occurs for a long time. Every number of cycles the pain level increases and if nothing pleasurable occurs then eventually the emotion section (32) interrupts when it reaches the pain interrupt threshold. The pain interrupt procedure automatically selects the decide procedure that tends to select good procedures. Even if it decides to do a bad procedure by using the instruction OVERRIDE, this only works up to a certain pain level (the instruction TSTORIDE is used to test if override is set). The pain interrupt procedure also automatically links goaltype/badgoal to the current goal so it does not select that goal over and over. If all it can find are bad goals then it uses the instructions TSTRCNT (test recent) and SUBRCNT to find bad goals that have not been executed recently. Once a procedure gets a pain interrupt, it not only is not selected by the decide routine, but if it does try to it again, it automatically restores the pain/pleasure level when it starts a procedure, and this would tend to cause another pain interrupt.

Ideas occasionally randomly activate, and if the data processing machine is getting bored with what it is doing and the random idea is interesting then it starts thinking about the random idea. In this way, it can get distracted from a boring task and not loop. When it gets bored, it can just wait for one of these random ideas to activate (explained below in the data emotion link explanation).

Pain can occur when the data processing machine tries to learn data that it already knows, such as when the source and relation and destination of what it is learning matches a link already in memory. When this happens, the pain level moves up, and if it reaches the pain threshold the data processing machine gets a pain type interrupt. Note that it is not boring if it writes the same source/relation, but a new destination, such as a new total when adding number, a new first place person during a race, or even a new pain/pleasure level associated with a goal. In all of these cases, it overwrites with a new destination. At boring, it interrupts (low pain) and the first part of the service procedure automatically updates the pain/pleasure level associated with the goal (CURGOALHLD is used to access the most recent goal) and sets its pain/pleasure level. It uses the instruction PNPL-TOHLD to move the pain/pleasure level to the hold register for use setting it as DDST.

The data processing machine links the pain/pleasure level to data as well as procedures. Whenever it gets a pain or pleasure interrupt, it links the emotion level to the data that is in the hold register (300). Later, when it recalls the data, the pain/pleasure level is recalled. It gets an internal pain or pleasure interrupt because it is recalled internally.

In one specific embodiment, a pain/pleasure array uses the value of the hold register (300) as an index into the array, similar to the sum array in FIG. 9. The array is initialized to a value midway between pain and pleasure interrupt values. At a pain or pleasure interrupt, the value of the hold register (300) is used to index the array and the pain or pleasure interrupt value is written into the location in the pain/pleasure array indexed by the hold register (300). Later when this node is recalled or recognized, the pain/pleasure value is restored only if this node has not been accessed in the last 5000 cycles. In this way, a node with strong emotions associated with it can shift the current pain/pleasure level.

In one specific embodiment of the emotion section, a pain/pleasure register is used. Every 600 cycles the pain/pleasure level is incremented. If data is accessed that has not been used for 5000 cycles then the pain/pleasure level is decremented (the lasuse array is used for this). If a procedure in manually executed, the pain/pleasure level is incremented because it is a form of work. Also, if there is data learning of a link that already exists then the pain/pleasure level is incremented. The threshold for a pain interrupt is set by a parameter file. The pleasure threshold is when the pain/pleasure level reaches 1. The pain interrupt occurs as the pain threshold is exceeded. The pleasure interrupt is delayed until the next ppopneg to allow a good procedure to continue.

Besides pain and pleasure, the data processing machine may have the emotion of tiredness. Pain and pleasure produce interrupts. Tiredness does not interrupt, but it does block activation of procedures if the data processing machine is too tired. The data processing machine does not always have to be performing a procedure. There are times when it is tired and just waits. When the machine focuses on a procedure to consider performing it, if the procedure is very interesting the machine can overcome tiredness. Before the machine executes a procedure, it must pass the pain/pleasure test and it must not be too tired to perform the procedure. Extremely tired is equivalent to sleep. The machine gets tired when it does a lot of procedures. Time (rest) makes the machine less tired. Tiredness helps the machine find efficient procedures. The tuning of the tired register is important. Too tired and the machine does not do enough. Too active and the machine just does anything and does not learn useful procedures because it just jumps from procedure to procedure. Danger eliminates tiredness and the machine starts the execution of situation-based procedures.

To implement tiredness, there may be a tiredness register which increases in value during work and decreases in value during pleasure or rest. This register may be incremented whenever something is manually executed. This register may be decremented whenever there is a pleasure interrupt. The tiredness register may also be decremented after a certain time period. The action test tired (TSTTIRED) tests the value of this tiredness register. If greater than a certain value, the branch status "nofind" may be set. If less than a certain value, the branch status "find" may be set. The action test very tired (TSTVTIRED) also tests the value of this register. If greater than a certain value, the branch status "nofind" may be set. If less, the branch status "find" may be set. These actions are used in the emotion procedures to determine whether to execute something.

In one specific embodiment, to implement the random activation of ideas with strong emotion, when there is a pain or pleasure interrupt, the value in the hold register is learned as a new link to emotion/pain or emotion/pleasure depending on the type of interrupt. Later, when deciding what to do, data nodes with these strong emotion links can be randomly selected using SUMATR and SELMAXR and in this way returned to the hold register for thinking about.

A data processing machine should have a forgetting mechanism. Otherwise, storage space would eventually be filled and there would be no place to learn new information. It also takes longer to find a piece of information when more information is stored (although the relationship is not linear). Therefore, getting rid of useless information helps speed up overall operation. To determine what information is least useful, a forgetting algorithm should include recency of use and total use. If we just save information that the data processing machine has used many times, it will forget all new information. If we just save information that is new, it will forget important old information used many times.

In one embodiment, the forgetting algorithm uses total use and recency of use to determine what to forget. These items are not stored based on a link, but are stored based on a node variable. For example, each time we put attention on something, we update the total use and recency of use of that item. We do not update each link that uses that item; we update the item in a total use array of all items and a recency array of all items. Whenever we are running out of memory or node numbers, we may activate the compress procedure. One procedure looks for the least total use of nodes last used over the last 1000 cycles ago to select a node to be forgotten then it goes through memory and removes every link using that node.

In one specific embodiment, the lastuse array described above in connection with the SUBRCNT instruction is used to determine the last cycle a node was used. Another array, the total use array, is incremented each cycle using the value in the hold register (300) as an index into the array. When the total use reaches 1000 for a particular entry it is no longer incremented (to prevent overflows). When the array of links reaches within 100 links of the maximum size for a particular implementation, such as 8000, then the link array is out of space and a node needs to be forgotten. The program looks at each node and if it has a less recent use and less total use than any other node then it, and all its links, are deleted and the array of links is compressed and frees up some links for other uses. This node's entry in the state in use array is set to 0. Note that some nodes are not available to be overwritten, no matter their lasuse or total use. These are nodes used for the emotion section explained above and are not to be forgotten. Other nodes may also be made not available to be forgotten. In particular, an initial engram containing a plurality of nodes and links may be desired to be fixed in memory.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A computer implemented method for processing data in a computer system that processes computer readable data information by operating on said data information in accordance with computer readable control state sequence information comprising:

storing computer readable information in a memory, wherein the computer readable information is stored in a memory structure in said memory that has at least two sets of three associated nodes, each set organized use a row, wherein a first node in said row is a source, a second node in said row is a relation, and a third node in said row is a destination, and wherein each destination node is associated with a source node and a relation node which defines the association between the source node and the destination node; and at least one of said at least two sets stores data information and at least one of said at least two sets stores control state sequence information,
    said set storing said control state sequence information containing a source node, a destination node, and a relation node defining the association between the source node and the destination node,
  and in addition to said set storing said control state sequence information, an instruction associated with said set storing said control state sequence information used to process the data information;
    performing, in a processor coupled to said memory, relational operations, including database queries, on the data in accordance with said control state sequence information, wherein said relational operations include setting values in two of a set of three data registers and selecting nodes for which the associated two nodes match the values in the two registers.

2. The method of claim 1, wherein the first data comprises cognitive data.

3. The method of claim 2, further comprising setting a sum value for each of the selected nodes and reporting the selected nodes to a user based upon the corresponding sum values.

4. The method of claim 1, wherein the source is a first state, the relation is a possible input, and the destination is a second state.

5. The method of claim 4, further comprising receiving the possible input and moving to the second state.

6. The method of claim 4, wherein the source is a first state and the relation is a default movement to a next state occurring when the operation of the first state is complete.

7. The method of claim 4 wherein the source is a first state and the relation is a default movement to a next state occurring when the operation of the first state is complete.

8. The method of claim 1, further comprising executing operations defined by the selected nodes.

9. The method of claim 8 wherein said execution operations defined by the selected nodes include subroutine cells, constants, or elemental instructions.

10. The method of claim 9 wherein said subroutine calls is stored in said memory as a sequence of links, each link with a source, relation, and destination.

11. The method of claim 10 wherein the source of each link that is a control link is the source state, the relation is the relation between the states, and the destination is the destination state.

12. The method of claim 9 further comprising moving to the destination state and, if the destination state is the last state of a subroutine, then automatically returning to the state that called said subroutine and proceeding past said subroutine.

13. The method of claim 1, further comprising recording one or more instructions.

14. The method of claim 13, further comprising storing the recorded instructions with a positive or negative indication associated with a result of the recorded instructions.

15. The method of claim 13, further comprising storing the recorded instructions with an indication of use of the instruction.

16. The method of claim 15, further comprising selectively removing recorded instructions from the memory, based at least in part upon said indication of use of one or more of the instructions.

17. The method of claim 1, further comprising spontaneously selecting instructions from an instruction memory and executing the spontaneously selected instructions.

18. The method of claim 17, wherein the spontaneously selected instructions are selected based at least in part upon a positive or negative indication associated with a result of the spontaneously selected instruction.

19. The method of claim 1, further comprising tracking a level during execution and generating an interrupt if the level exceeds a threshold value.

20. The method of claim 19, further comprising incrementing the level when a procedure is repeated or identical data is stored in memory.

21. The method of claim 20, further comprising incrementing the level when a procedure associated with a positive indication is executed and decrementing the level when a procedure associated with a negative indication is executed.

22. A system for processing data in a computer system that processes computer readable data information by operating on said data information in accordance with computer readable control state sequence information, comprising:

a memory, wherein the memory includes a cognitive data section which stores data in a memory structure in said memory that has at least two sets of associated nodes, each set organized as a row, wherein a first node in said row is a source, a second node in said row is a relation, and a third node in said row is a destination, and wherein each destination node is associated with a source node and a relation node which defines the association between the source node and the destination node; and at least one of said at least two sets stores data information and at least one of said at least two sets stores control state sequence information,
    said set storing said control state sequence information containing a source node, a destination node, and a relation node defining the association between the source node and the destination node,
  and in addition to said set storing said control state sequence information, an instruction associated with said set storing said control state sequence information used to process the data information,
  a control system configured to execute relational operations, including database queries, on the data in the cognitive data section in accordance with said control state sequence information, wherein said relational operations include setting values in two of a set of three data registers and selecting nodes for which the associated two nodes match the values in the two registers.

23. The system of claim 22, wherein the first data comprises cognitive data.

24. The system of claim 23, wherein the relational operations include setting a sum value for each of the selected nodes and reporting the selected nodes to a user based upon the corresponding sum values.

25. The system of claim 22, wherein the source is a first state, the relation is a possible input, and the destination is a second state.

26. The method of claim 25, wherein the control section operates based upon the control data.

27. The system of claim 22, further comprising an emotion system.

28. The system of claim 27, wherein the emotion system is operable to cause one or more instructions to be recorded.

29. The system of claim 28, wherein the recorded instructions are stored with a positive or negative indication associated with a result of the recorded instructions.

30. The system of claim 28, wherein the recorded instructions are stored with an indication of use of the instruction.

31. The system of claim 30, wherein the emotion system is operable to cause instructions to be removed from the memory based upon the associated indications of use of the instructions.

32. The system of claim 27, wherein the emotion section is operable to spontaneously select instructions from an instruction memory and cause execution of the spontaneously selected instructions.

33. The system of claim 32, wherein the spontaneously selected instructions are selected based at least in part upon a positive or negative indication associated with a result of the spontaneously selected instruction.

34. The system of claim 22, wherein the emotion system is capable of tracking a level during execution and causing an interrupt it the level exceeds a threshold value.

35. The system of claim 34, wherein the emotion system is operable to increment the level when a procedure is repeated or identical data is stored in memory.

36. The system of claim 35, wherein the emotion system is operable to increment tile level when a procedure associated with a positive indication is executed and decrement the level when a procedure associated with a negative indication is executed.

37. One or more processor readable storage devices having processor readable code embodied on said processor readable storage devices, said processor readable code for programming one or more processors to perform a method of processing data in a computer system that processes computer readable data information by operating on said data information in accordance with computer readable control state sequence information, comprising:

storing computer readable information in, a memory, wherein the computer readable information is stored in a memory structure in said memory that has at least two sets of three associated nodes, each set organized as a row, wherein a first node in said row is a source, a second node in said row is a relation, and a third node in said row is a destination, and wherein each destination node is associated with a source node and a relation node which defines the association between the source node and the destination node; and at least one of said at least two sets stores data information and at least one of said at least two stores control state sequence information, said set storing said control state sequence information containing a source node, a destination node, and a relation node defining the association between the source node and the destination node, and in addition to said set storing said control state sequence information, an instruction associated with said set storing said control state sequence information used to process the data information, performing, in a processor coupled to said memory, relational operations, including database queries, on the data in accordance with said control state sequence information, wherein said rotational operations include setting values in two of a set of three data registers and selecting nodes for which the associated two nodes match the values in the two registers.

38. The one or more processor readable storage devices of claim 37, wherein the first data comprises cognitive data.

39. The one or more processor readable storage devices of claim 38, further comprising setting a sum value for each of the selected nodes and reporting the selected nodes to a user based upon the corresponding sum values.

40. The one or more processor readable storage devices of claim 37, wherein the source is a first state, the relation is a possible input, and the destination is a second state.

41. The one or more processor readable storage devices of claim 40, further comprising receiving the possible input and moving to the second state.

42. The one or more processor readable storage devices of claim 37, further comprising executing operations defined by the selected nodes.

43. The one or more processor readable storage devices of claim 37, further comprising recording one or more instructions.

44. The one or more processor readable storage devices of claim 43, further comprising storing the recorded instruction with a positive or negative indication associated with a result of the recorded instructions.

45. The one or more processor readable storage devices of claim 43, further comprising storing the recorded instructions with an indication of use of the instruction.

46. The one or more processor readable storage devices of claim 45, further comprising selectively removing recorded instructions from the memory, based at least in part upon said indications of use of the instructions.

47. The one or more processor readable storage devices of claim 37, further comprising spontaneously selecting instructions from an instruction memory and executing the spontaneously selected instructions.

48. The one or more processor readable storage devices of claim 47, wherein the spontaneously selected instructions are selected based at least in part upon a positive or negative indication associated with a result of the spontaneously selected instruction.

49. The one or more processor readable storage devices of claim 37, further comprising tracking a level during execution and generating an interrupt if the level exceeds a threshold value.

50. The one or more processor readable storage devices of claim 49, further comprising incrementing the level when a procedure is repeated or identical data is stored in memory.

51. The one or more processor readable storage devices of claim 50, further comprising incrementing the level when a procedure associated with a positive indication is executed and decrementing the level when a procedure associated with a negative indication is executed.

52. The one or more processor readable storage devices of claim 42 wherein said operations defined by the selected nodes include subroutine cells, constants, or elemental instructions.

53. The one or more processor readable storage devices of claim 52 wherein said subroutine calls is stored in said memory as a sequence of links, each link with a source, relation, and destination.

54. The one or more processor readable storage devices of claim 53 wherein the source of each link that is a control link is the source state, the relation is the relation between the states, and the destination is the destination state.

55. The one or more processor readable storage devices of claim 52 further comprising moving to the second state and, if the second state is the last state of a subroutine call, then automatically returning to the state of said subroutine call.

* * * * *